UNITED STATES PATENT OFFICE.

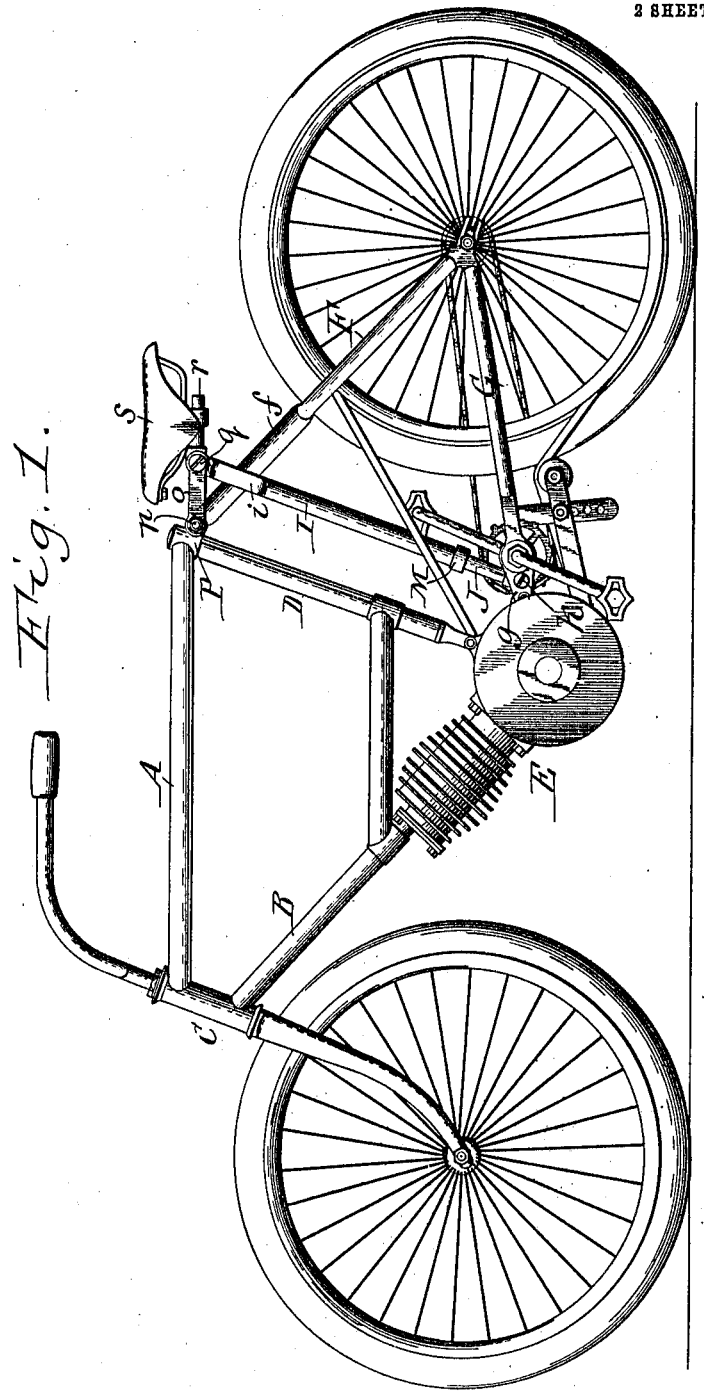

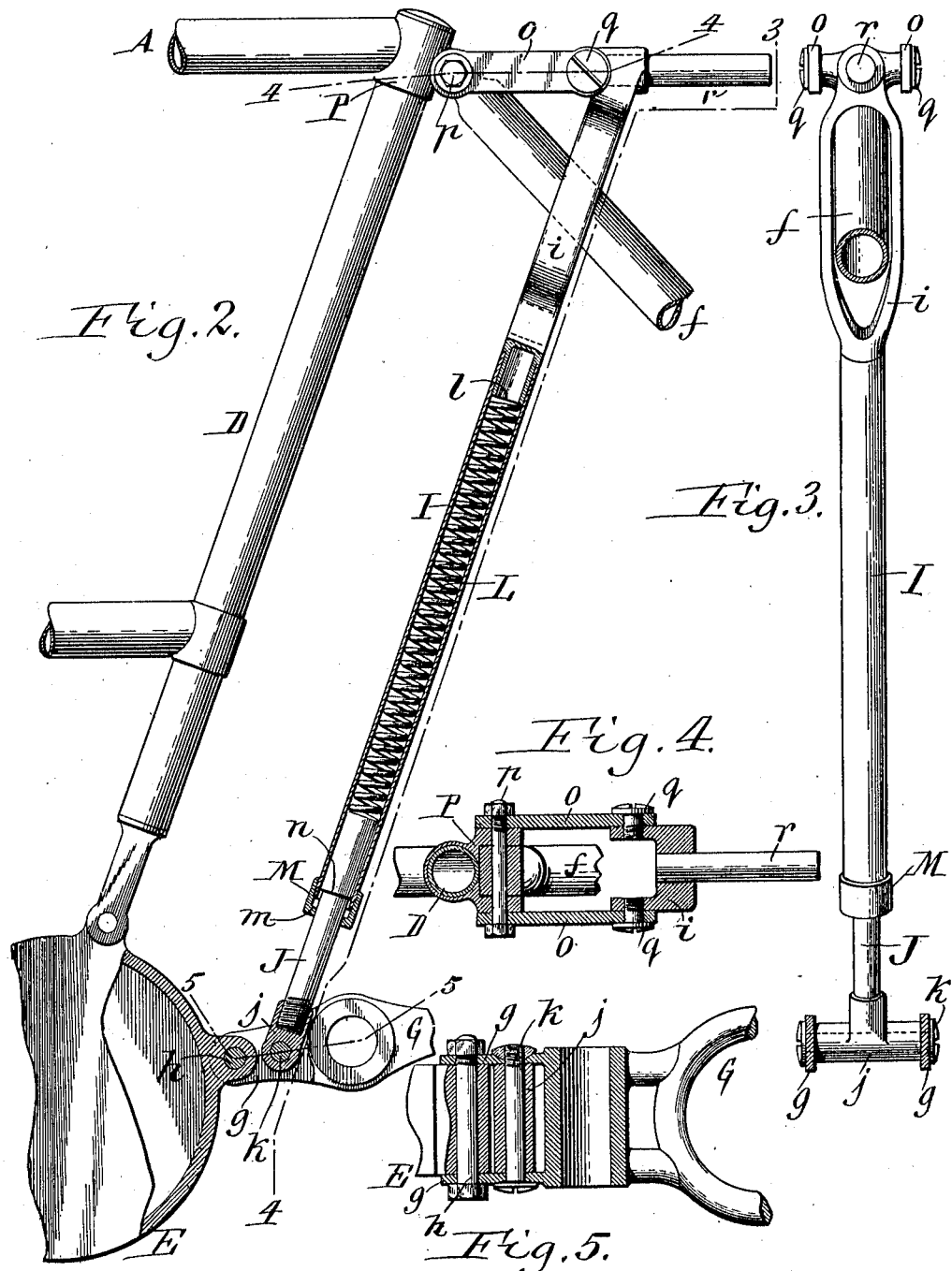

CLARENCE E. BECKER, OF BUFFALO, NEW YORK, ASSIGNOR TO THE AUTO BI COMPANY, OF BUFFALO, NEW YORK, A CORPORATION OF NEW YORK.

SADDLE-SUPPORT FOR MOTOR-CYCLES, &c.

970,458.     Specification of Letters Patent.    Patented Sept. 20, 1910.

Application filed November 16, 1908. Serial No. 462,795.

*To all whom it may concern:*

Be it known that I, CLARENCE E. BECKER, a citizen of the United States, residing at Buffalo, in the county of Erie and State of New York, have invented a new and useful Improvement in Saddle-Supports for Motor-Cycles, &c., of which the following is a specification.

This invention relates to a yielding or elastic saddle support which is more particularly designed for use on motor cycles although the same may also be used in other kinds of cycles. In the seat supports for this purpose as heretofore constructed there is considerable friction in the joint between the parts which move one relatively to the other, thereby materially interfering with the free cushioning effect of the springs. This is particularly objectionable in the case of motor cycles in which the high speed of the cycle when in motion causes the seat support to bear rearwardly against its guideway in the seat post and thus stick or bind in the same so that the yielding action of the internal seat spring is in a measure nullified. To overcome this it has been proposed to construct the main frame of the cycle in sections which are jointed or pivotally connected and provided with interposed cushioning springs. This is objectionable inasmuch as it interferes with the stability of the frame particularly in the case of motor cycles which are subjected to high strains.

It is the object of this invention to provide a seat or saddle support for motor cycles and the like which will permit of constructing the main frame without movable joints, which will avoid undue frictional resistance, binding or sticking of the parts of the support which are movable one relatively to the other, and which will permit of utilizing the full resilience of the spring for yieldingly supporting the seat or saddle, so that the cycle may be ridden with the greatest ease and comfort over rough pavements or roads and at the same time retaining the saddle always in a horizontal position.

In the accompanying drawings consisting of two sheets: Figure 1 is a side elevation of a motor cycle provided with my improved saddle support. Fig. 2 is a fragmentary side elevation, partly in section, of the saddle support and the adjacent parts of a motor cycle frame. Fig. 3 is a vertical cross section in line 3—3, Fig. 2. Figs. 4 and 5 are horizontal sections taken in the correspondingly numbered lines in Fig. 2.

Similar letters of reference indicate corresponding parts throughout the several views.

The main frame of the cycle may be variously constructed but that shown in the drawings for illustrating the application of my invention to a motor cycle comprises upper and lower front bars A, B which are connected at their front ends to the steering head C, an upright strut D extending downwardly from the rear end of the upper bar, a motor or engine E having its piston and casing connected respectively with the rear end of the lower bar and the lower end of the strut, an upper rear fork F extending rearwardly from the upper end of the strut, and a lower rear fork G extending rearwardly from the motor casing and connected at its rear end to the upper fork. At its front end the upper rear fork is constructed to form a single stem $f$ for connection with the adjacent upper end of the strut and the rear end of the upper bar and the front end of the lower fork is bifurcated and connects at the front end of its members $g$, $g$ with the rear part of the motor or engine casing by means of a transverse bolt $h$ or otherwise. My improved saddle support which is applied to this cycle frame is constructed as follows:

I, J, represent the upper and lower sections of a telescopic seat or saddle post. The upper section of this post is made of tubular form and provided at its upper end with a loop-shaped part or yoke $i$ which embraces the stem $f$ at the front end of the upper frame fork. The lower section of the sectional seat post is constructed in the form of a plunger or rod which slides at its upper end in the lower end of the tubular seat post section while its lower end is provided with a T-shaped head $j$ which is arranged between the members $g$, $g$ of the bifurcated front end of the lower fork and pivoted thereto by a transverse horizontal bolt $k$ so that this rod or plunger and the parts coöperating therewith are capable of turning in a vertical plane lengthwise of the cycle frame. The upper and lower sections of the saddle post are yieldingly held in an extended position by means of a spiral spring L arranged within the upper tubular section of the post and bearing at its upper end against an internal shoulder $l$ formed in this tubular section by the lower end of the yoke while the lower end of the spring bears against the upper end of the plunger. The extensibility of the sectional seat post is limited by a stop device which preferably consists of a sleeve M screwed upon the lower end of the tubular seat post section and provided at its lower end with an internal flange forming an upwardly facing shoulder $m$ which is adapted to engage with an external downwardly facing shoulder $n$ on the plunger.

$o$, $o$ represents a pair of vertically swinging links which are arranged lengthwise on opposite sides of the upper part of the frame and pivotally connected at their front ends by a horizontal transverse bolt $p$ with the fitting P at the junction of the upper front bar the upper rear fork and the upper end of the strut while the rear ends of these links are connected by horizontal transverse pivot screws $q$, $q$ with opposite sides of the upper end of the yoke.

Projecting horizontally rearward from the upper end of the yoke is a shank $r$ upon which the rider's seat or saddle $s$ is secured in any suitable manner.

As the rider sits on the seat or saddle, the upper section of the seat post is depressed and the spring is compressed, thereby yieldingly supporting the load on the seat. During this downward movement of the saddle and upper seat post section, the links swing downwardly and the lower seat post section turns on the frame. As the parts thus adapt themselves to the changing positions there is no tendency to bind or stick and there is no frictional resistance which would operate to restrain the free movement of the parts, thereby enabling the full resilience of the spring to be utilized for cushioning the load on the seat and the shock which is encountered when the motor cycle drops into a depression or strikes an obstruction in the road. Furthermore, this construction permits of utilizing a rigid or one piece frame while obtaining all the desirable effects of a jointed spring frame without the objectionable features inherent in a frame of the last mentioned type, such as rattling due to wearing of joints.

Although the support for the saddle rises and falls with the variations in the load on the same the saddle always remains in a horizontal position so that the rider does not assume a tilting position at any time.

I claim as my invention:

1. The combination of a cycle frame, a vertically swinging link pivoted on the upper part of the frame, a seat post composed of an upper tubular section which is pivoted at its upper end to said link and a lower plunger section arranged within the tubular section and pivoted on the lower part of the frame, and a spring arranged in the tubular section of the seat post and operating to hold said seat post sections yieldingly in an extended position.

2. The combination of a cycle frame, a vertically swinging link pivoted on the upper part of the frame, a seat post composed of an upper tubular section which is pivoted at its upper end to said link and a lower plunger section arranged within the tubular section and pivoted on the lower part of the frame, a spring arranged in the tubular section of the seat post and operating to hold said seat post sections yieldingly in an extended position, and a stop for limiting the upward movement of the tubular section on the plunger section.

3. The combination of a cycle frame, a vertically swinging link pivoted on the upper part of the frame, a seat post composed of an upper tubular section which is pivoted at its upper end to said link and a lower plunger section arranged within the tubular section and pivoted on the lower part of the frame, a spring arranged in the tubular section of the seat post and operating to hold said seat post sections yieldingly in an extended position and a stop for limiting the upward movement of the tubular section on the plunger section consisting of a screw sleeve arranged on the lower end of said tubular section and provided with an internal upwardly facing shoulder which is adapted to engage with an external downwardly facing shoulder on said plunger section.

4. The combination of a cycle frame, a seat post having an upper yoke or loop shaped section which embraces an adjacent member of the frame and a lower section which is pivoted on the lower part of the frame and has a telescopic connection with said loop shaped section, a vertically swinging link pivotally connected with the upper part of the frame and the upper part of said loop shaped section, and a spring for holding said seat post sections yieldingly in an extended position.

5. The combination of a cycle frame, a seat post having an upper yoke or loop shaped section which embraces an adjacent member of the frame and a lower section which is pivoted on the lower part of the frame and has a telescopic connection with said loop shaped section, a pair of vertically swinging links arranged on opposite sides of the upper part of the frame and pivoted at their front ends to said frame while their rear ends are pivoted to the upper end of said loop shaped section, and a spring operating to hold said seat post sections yieldingly in an extended position.

6. The combination of a cycle frame, a vertically swinging link pivoted at one end on the frame, a telescopic seat post having an upper section which is pivoted on said link and a lower section which is pivoted directly on the frame, a spring mounted on said seat post for holding its sections yieldingly in an extended position, and a shank arranged on the upper seat post section and adapted to receive a seat.

Witness my hand this 29th day of October, 1908.

CLARENCE E. BECKER.

Witnesses:
 THEO. L. POPP,
 E. M. GRAHAM.